(12) United States Patent
Rai et al.

(10) Patent No.: US 8,274,688 B2
(45) Date of Patent: Sep. 25, 2012

(54) CAPACITY PLANNING INCORPORATING JOB SIZE DISTRIBUTION

(75) Inventors: Sudhendu Rai, Fairport, NY (US); John C. Handley, Fairport, NY (US)

(73) Assignee: Xerox Corporation, Norwalk, CT (US)

( * ) Notice: Subject to any disclaimer, the term of this patent is extended or adjusted under 35 U.S.C. 154(b) by 673 days.

(21) Appl. No.: 12/466,999

(22) Filed: May 15, 2009

(65) Prior Publication Data

US 2010/0290079 A1 Nov. 18, 2010

(51) Int. Cl.
G06F 15/00 (2006.01)
G06F 9/46 (2006.01)
(52) U.S. Cl. ...................... 358/1.15; 718/102
(58) Field of Classification Search .................. 358/1.12
See application file for complete search history.

(56) References Cited

U.S. PATENT DOCUMENTS

2003/0090716 A1* 5/2003 Umebayashi ................ 358/1.15
2006/0262335 A1* 11/2006 Varga ........................... 358/1.13

* cited by examiner

*Primary Examiner* — Saeid Ebrahimi Dehkordy
(74) *Attorney, Agent, or Firm* — Fox Rothschild LLP

(57) ABSTRACT

Methods and systems for determining print capacity are disclosed. A maximum job speed for a document processing device and information pertaining to a plurality of jobs performed by the document processing device may be received. The information may include a job speed and a job size for each job. Sets of first and second jobs may be identified from the plurality of jobs. Each first job may have a job speed greater than a percentage of the maximum job speed. Each second job may have a job speed less than the percentage of the maximum job speed. A job size threshold may be determined based on the job sizes for the first and second jobs. In response to such determination, a linear function based on the one or more second jobs may be obtained. The linear function may be a function of job speed based on job size.

23 Claims, 4 Drawing Sheets

CAPACITY PLANNING INCORPORATING JOB SIZE DISTRIBUTION

BACKGROUND

The present disclosure generally relates to document processing devices. More specifically, the present disclosure relates to methods and systems for determining the capacity of a document processing device based on at least a job size distribution for the device.

Document production environments, such as print shops, convert printing orders, such as print jobs, into finished printed material. A print shop may process print jobs using document processing devices such as printers, cutters, collators and other similar equipment. Typically, document processing devices in print shops are organized such that when a print job arrives from a customer at a particular print shop, the print job can be processed by performing one or more production functions.

It is common for print shops to receive print jobs having variable job sizes. However, the dependence of a document processing device's speed on job size distribution is not currently considered when making decisions relating to print capacity in print shops. This can result in customer dissatisfaction and poor service levels.

Typically, when evaluating a speed for a printer or other document processing device, a rated speed is reduced by a factor to determine an effective speed for capacity planning purposes. However, when a job mix includes very small jobs mixed with large jobs (i.e., a heavy-tailed distribution), the effective printing speed that is actually achieved is significantly lower than this estimation. The improper estimation of job speed likely occurs because small jobs can be delayed if they are queued behind a very large job and large jobs can experience flow interruptions if several small jobs requiring multiple setups are ahead of the large job in the queue. Jobs can also be delayed while waiting for resources such as paper or toner. The hardware and software that processes jobs can also automatically enter maintenance or calibration modes in which printing cannot occur.

SUMMARY

Before the present systems, devices and methods are described, it is to be understood that this disclosure is not limited to the particular systems, devices and methods described, as these may vary. It is also to be understood that the terminology used in the description is for the purpose of describing the particular versions or embodiments only, and is not intended to limit the scope.

It must also be noted that as used herein and in the appended claims, the singular forms "a," "an," and "the" include plural references unless the context clearly dictates otherwise. Thus, for example, reference to a "job" is a reference to one or more jobs and equivalents thereof known to those skilled in the art, and so forth. Unless defined otherwise, all technical and scientific terms used herein have the same meanings as commonly understood by one of ordinary skill in the art. Although any methods, materials, and devices similar or equivalent to those described herein can be used in the practice or testing of embodiments, the preferred methods, materials, and devices are now described. All publications mentioned herein are incorporated by reference, Nothing herein is to be construed as an admission that the embodiments described herein are not entitled to antedate such disclosure by virtue of prior invention. As used herein, the term "comprising" means "including, but not limited to."

In an embodiment, a system for determining print capacity may include a processor and a storage medium in operable communication with the processor. The storage medium may include one or more programming instructions for receiving a maximum job speed for a document processing device, receiving information pertaining to a plurality of jobs performed by the document processing device, including a job speed and a job size for each job, identifying, via the processor, a set of first jobs, each having a job speed greater than a percentage of the maximum job speed, and a set of second jobs, each having a job speed less than the percentage of the maximum job speed, from the plurality of jobs, determining, via the processor, a job size threshold based on the job sizes for the first jobs and the job sizes for the second jobs, and in response to determining the job size threshold, obtaining, via the processor, a linear function based on one or more second jobs, where the linear function includes a function of job speed based on job size.

In an embodiment, a computer-implemented method of determining print capacity including receiving a maximum job speed for a document processing device, receiving information pertaining to a plurality of jobs performed by the document processing device, including a job speed and a job size for each job, identifying, via a processor, a set of first jobs, each having a job speed greater than a percentage of the maximum job speed, and a set of second jobs, each having a job speed less than the percentage of the maximum job speed, from the plurality of jobs, determining, via the processor, a job size threshold based on the job sizes for the first jobs and the job sizes for the second jobs, and, in response to determining the job size threshold, obtaining, via the processor, a linear function based on one or more second jobs, where the linear function comprises a function of job speed based on job size.

In an embodiment, a computer-implemented method of determining print capacity may include receiving a maximum job speed for a document processing device, receiving information pertaining to a plurality of jobs performed by the document processing device, including a job speed and a job size for each job, for each job, classifying, via a processor, the job into one of a plurality of groups based on the job speed for the job, determining, via the processor, a job threshold size for a group based on at least the jobs classified within the group, and, in response to determining the job size threshold, applying, via the processor, a regression model to the plurality of groups to determine a function for an expected device capacity based on job size.

BRIEF DESCRIPTION OF THE DRAWINGS

Aspects, features, benefits and advantages of the present invention will be apparent with regard to the following description and accompanying drawings, of which.

DETAILED DESCRIPTION

The following terms shall have, for the purposes of this application, the respective meanings set forth below.

A "document processing device" refers to a machine that is used to perform one or more operations that results in a completed document. Exemplary document processing devices include, for example and without limitation, a printer, a cutter, a collator, a scanner, a binder, and a hole puncher.

A "print shop" refers to an entity that includes a plurality of document processing devices. A print shop may be a free-standing entity, including one or more print-related devices, or it may be part of a corporation or other entity. Additionally, a print shop may communicate with one or more servers by way of a local area network or a wide area network, such as the Internet, the World Wide Web or the like.

A "job" refers to a logical unit of work that is to be completed for a customer. A job may include one or more print jobs from one or more clients. A production system may perform a plurality of jobs. Although the disclosed embodiments pertain to document processing systems, the disclosed methods and systems can be applied to processing systems in general.

A "print job" refers to a job processed by a document processing device. For example, a print job may include producing credit card statements corresponding to a certain credit card company, producing bank statements corresponding to a certain bank, printing a document, or the like. Although the disclosed embodiments pertain to print jobs, the disclosed methods and systems can more generally be applied to jobs in other processing environments, such as automotive manufacturing, semiconductor production and the like.

A "job size distribution" refers to a probability distribution of a real-valued random variable. Exemplary types of job size distributions include, without limitation, normal distributions, exponential distributions, logarithmic distributions, cumulative distributions and the like.

A group of jobs having a job size distribution with a large range of job sizes may be referred to as having a heavy-tailed distribution. A heavy-tailed distribution may be characterized as a job size distribution possessing a tail that decays slowly, in other words, as the value of the random variable increases, a probability associated with the random variable decreases. However, a non-zero probability is associated with very large values of the random variable. Heavy-tailed distributions may include many small jobs mixed with a few very large jobs. A finite sample size drawn randomly from a heavy-tailed distribution may have a very high variance. As such, even though the majority of the job sizes are small, a substantial contribution to the mean or variance for the jobs considered in the distribution may come from the few large jobs. Accordingly, a substantial difference may exist between the mean and median values of job size for heavy-tailed distributions.

Figure 1:
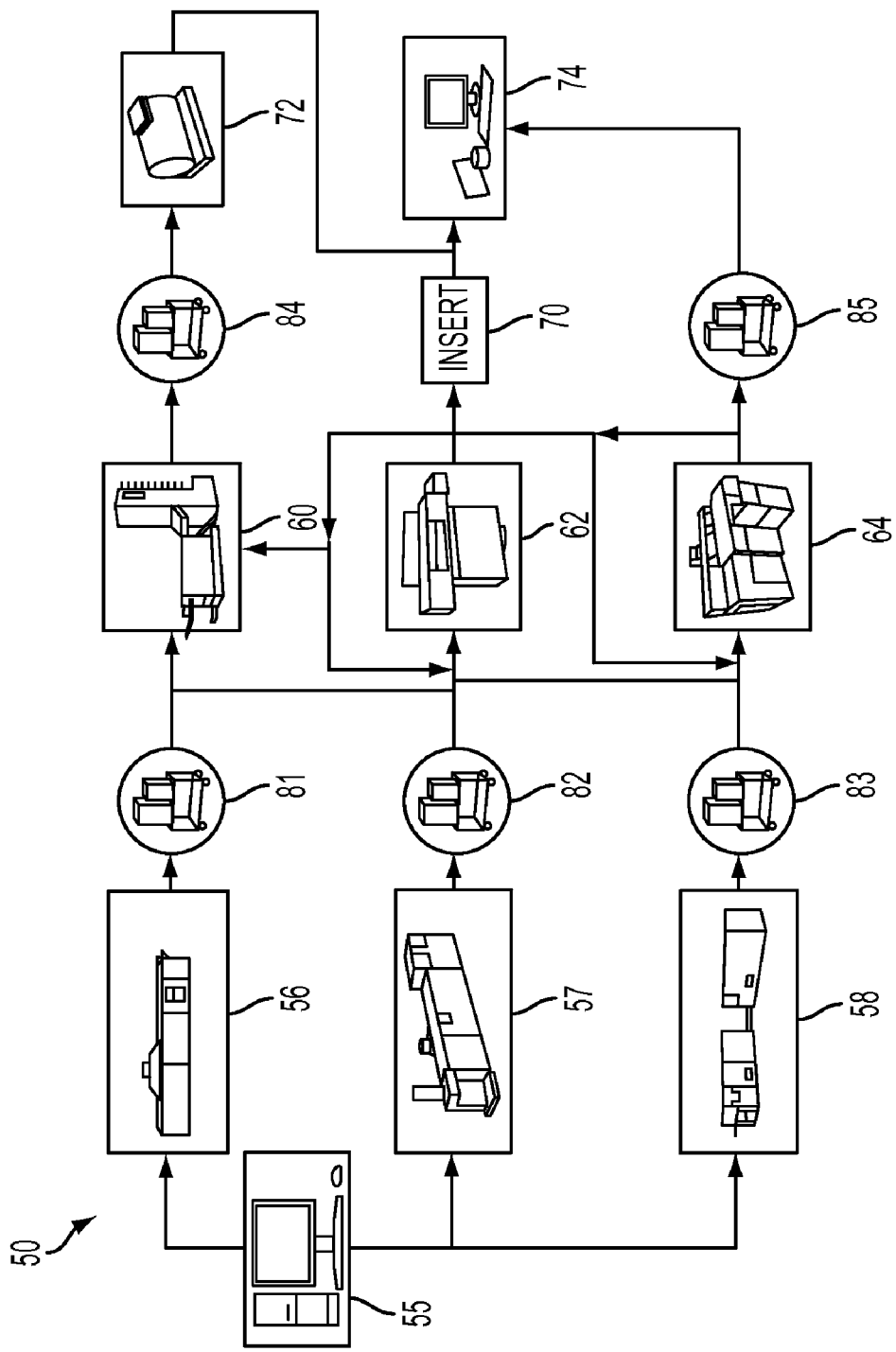
FIG. 1 depicts an exemplary print shop production environment according to an embodiment.

FIG. 1 depicts an example of a production, environment 50, in this case, exemplary elements of a print shop. Print jobs may enter the print shop manually or electronically and be collected at an electronic submission system 55 such as a computing device and/or scanner. Jobs are sorted and batched at the submission system or another location before being delivered to one or more print engines such as a color printer 56, a black-and-white printer 57 and/or a continuous teed printer 58, Jobs may exit the print engine and be delivered to one or more finishing devices or areas such as a collator 60, a cutter 62, and/or a binder 64. The finishing areas may include automatic or manual areas for such finishing activities. Such finishing areas may also include an automatic or manual inserter 70. Finally, jobs may move to a postage metering station 72 and/or shipping station 74. Jobs may move from one location to another in the print shop by automatic delivery or manual delivery such as by hand or by one or more paper carts 81-85. Other devices may also be used in a production environment within the scope of this disclosure.

Figure 2:
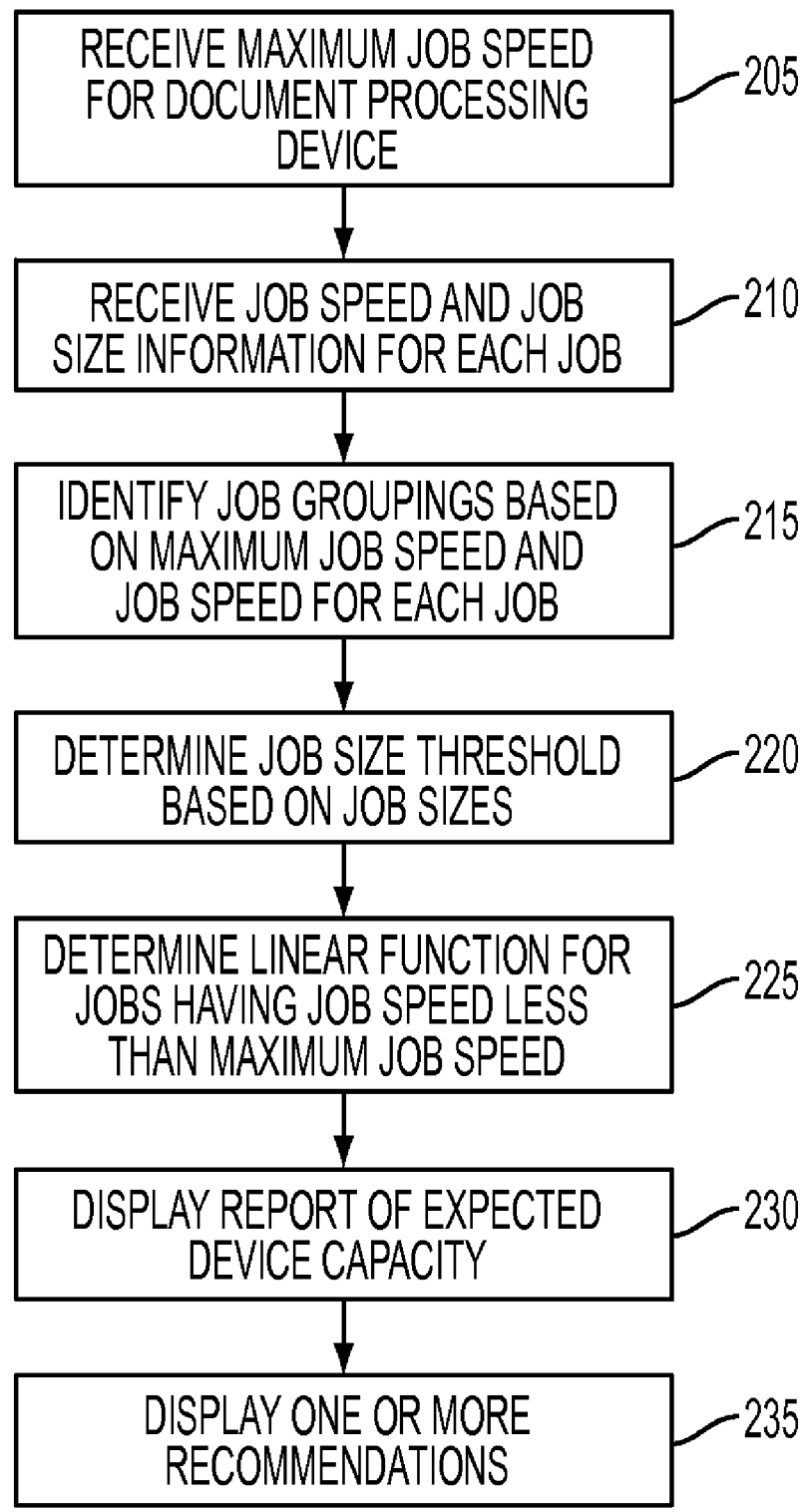
FIG. 2 depicts a flow diagram of an exemplary method of determining print capacity according to an embodiment.

FIG. 2 depicts a flow diagram of an exemplary method of determining print capacity according to an embodiment. As shown in FIG. 2, a maximum job speed may be received 205 for a document processing device. The maximum job speed may represent a rate at which the document processing device operates. For example and without limitation, a printing device may have a maximum job speed that is measured in printed pages per hour, a book binder may have a maximum job speed that is measured in books bound per hour, or the like. In an embodiment, the maximum job speed may be received 205 from a database stored in a memory that is associated with the document processing device. In an alternate embodiment, the maximum job speed may be received 205 from a user.

Information pertaining to a plurality of jobs performed by the document processing device may be received 210 as well. The information may include a job speed and a job size for each of the plurality of jobs performed by the document processing device. In an embodiment, the information may be received 210 from a user. In an alternate embodiment, data may be retrieved from a log file corresponding to the document processing device. The retrieved data may then be used to determine a job speed and a job size for each job.

Based on the received information and the maximum job speed, a processor may identify 215 a set of first jobs and a set of second jobs from the plurality of jobs. Each first job has a job speed that is greater than a percentage of the maximum job speed. Each second job has a job speed that is less than the percentage of the maximum job speed. In an embodiment, the percentage is equal to 80% of the maximum job speed.

The processor may determine 220 a job size threshold based on the job sizes for the jobs in the set of first jobs and the job sizes for the jobs in the set of second jobs. In an embodiment, the job size threshold may be determined 220 by determining a size at which substantially all jobs in the first set of jobs are larger than such size and substantially all jobs in the second set of jobs are less than such size. In an embodiment, "substantially all" refers to at least 90% of the jobs in each set. In an alternate embodiment, "substantially all" refers to at least 95% of the jobs in each set. Other values may also be used within the scope of this disclosure.

In an alternate embodiment, the processor may determine 220 the job size threshold by determining a size such that the sum of the number of first jobs having a job size greater than such size and the number of second jobs having a job size less than such size is maximized. With respect to such an embodiment, the job size threshold may be further constrained by requiring that at least a first percentage of the job sizes of the first jobs are greater than the job size threshold and/or that, at least a second percentage of the job sizes of the second jobs are less than the job size threshold.

The processor may obtain 225 a linear function based on one or more of the second jobs. The linear function may be obtained 225 in response to the determination 220 of the job size threshold. In an embodiment, obtaining 225 a linear function may include determining the linear function as a function of job speed based on job size for the second jobs. In an embodiment, the linear function may be obtained 225 based on one or more second jobs having a job size less than the job size threshold. In other words, all jobs that have a job speed that is less than the percentage of the maximum job speed and a job size that is less than the job size threshold may be considered. By excluding second jobs that have a job size that is greater than the job size threshold, statistical outliers may be excluded from consideration. In an alternate embodiment, all second jobs may be used to obtain 225 the linear function.

in an embodiment, a report of an expected device capacity for the document processing device may be stored 230. The report may include information pertaining to the actual print speed and capacity of the document printing device based on at least the linear function and the job size threshold. For example, the report may state that for all jobs having a job size that is less than the job size threshold, the job speed may be determined based on the linear function and the job size for the job. Similarly, the report may state that the percentage of the maximum job speed may be utilized as an effective job speed for all jobs having a job size that is greater than the job size threshold. In an embodiment, the stored report may be displayed to a user.

In an embodiment, one or more recommendations may be stored 235. The one or more recommendations may be stored 235 as part of the report or separately. The one or more recommendations may provide direction to a user as to how to adjust, or expand print capacity. For example, the one or more recommendations may include information pertaining to adding one or more document processing devices to an environment in order to expand print capacity.

Figure 3:
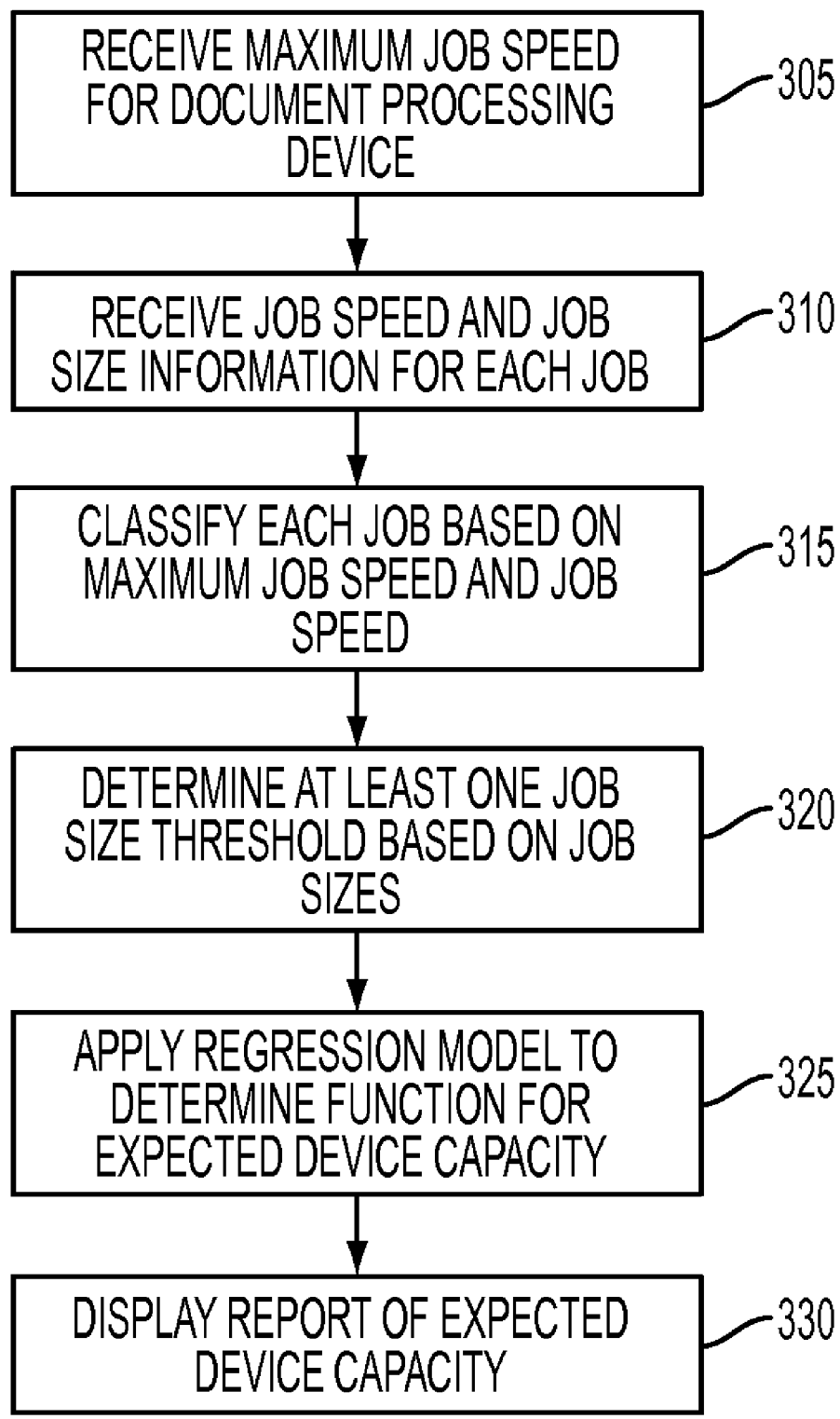
FIG. 3 depicts a flow diagram of an alternate exemplary method for determining a print capacity according to an embodiment.

In some cases, it may be useful to group the job data into a plurality of subsets. In an embodiment, a plurality of job groupings may be used to determine a nonlinear regression model according to the principles described above. FIG. 3 depicts a flow diagram of an alternate exemplary method for determining a print capacity according to an embodiment. As shown in FIG. 3, a maximum job speed for a document processing device may be received 305. The maximum job speed may represent a rate at which the document processing device operates. For example and without limitation, a printing device may have a maximum job speed that is measured in printed pages per hour, a book binder may have a maximum job speed that is measured in books bound per hour, or the like, hi an embodiment, the maximum job speed may be received 305 from a database stored in a memory that is associated with the document processing device. In an alternate embodiment, the maximum job speed may be received 305 from a user.

Information pertaining to a plurality of jobs performed by the document processing device may be received 310 as well. The information may include a job speed and a job size for each of the plurality of jobs performed by the document processing device. In an embodiment, the information may be received 310 from a user. In an alternate embodiment, data may be retrieved from a log file corresponding to the document processing device. The retrieved data may then be used to determine a job speed and a job size for each job.

A processor may classify 315 each job into one of a plurality of groups based on the job speed for the job. For example, the processor may classify 315 a job having a job speed that is greater than a first percentage of the maximum job speed in a first group. Likewise, the processor may classify 315 a job having a job speed that is less than the first percentage of the maximum job speed, but greater than a second percentage of the maximum job speed, in a second group. The processor may farther classify 315 additional jobs into groups, including additional groups, as necessary.

The processor may determine 320 a job size threshold, for at least one group. In an embodiment, the processor may determine 320 a job size threshold for a first group based on the job sizes for the jobs in a first group and the job sizes for jobs in a second group having: a job speed range that is just below the first group (i.e., the jobs in the first group are determined by selecting jobs that have a job speed that is greater than a first percentage of the maximum job speed and the jobs in the second group are determined by selecting jobs that have a job speed that is less than the first percentage of the maximum job speed, but greater than a second percentage of the maximum job speed). In an embodiment, the job size threshold may be determined 320 by determining a size at which substantially all jobs in the first group have a job size that is greater than such size and substantially all jobs in the second group have a job size that is less than such size. In an embodiment, "substantially all" refers to at least 90% of the jobs in each set. In an alternate embodiment, "substantially all" refers to at least 95% of the jobs in each set. Other values may also be used within the scope of this disclosure.

In an alternate embodiment, the processor may determine 320 the job size threshold by determining a size such that the sum of the number of jobs in the first group having a job size greater than such size and the number of jobs in the second group having a job size less than such size is maximized. With respect to such an embodiment, the job size threshold may be further constrained by requiring that at least a first percentage of the job sizes of the first jobs are above the job size threshold and/or a second percentage of the job sizes of the second jobs are below the job size threshold.

In an alternate embodiment, the processor may determine 320 a job size threshold for a first group based on the job sizes for jobs having a job speed greater than a lower bound for the first group and the job sizes for jobs having a job speed less than the lower bound for the first group. In such an embodiment, the processor may determine 320 the job size threshold based on all jobs. In an embodiment, the job size threshold may be determined 320 by determining a size at which substantially all jobs having a job speed that is greater than the lower bound for the first, group have a job size that is greater than such size and substantially all jobs having a job speed that is less than the lower bound for the first group have a job size that is less than such size.

In an alternate embodiment, the processor may determine 320 the job size threshold by determining a size such that the sum of the number of jobs in the first group having a job size greater than such size and the number of jobs in the second group having a job size less than such size is maximized. With respect to such an embodiment, the job size threshold may be further constrained by requiring that at least a first percentage of the job sizes of the first jobs are above the job size threshold and a second percentage of the job sizes of the second jobs are below the job size threshold.

In an embodiment, the processor may determine 320 a job size threshold between each pair of groups having adjacent job speed ranges.

The processor may apply 325 a regression model to the plurality of groups to obtain a function for an expected device capacity based on job size. In an embodiment, the processor may apply 325 the regression model in response to the determination 320 of the job size threshold. The regression model may include, without limitation. Classification and Regression Trees (CART) or Multivariate Adaptive Regression Splines (MARS). The regression model may be used to predict future performance based on past behavior. The function may be obtained 325 as a function of job speed based on job size. In an embodiment, the function may be obtained 325 based on one or more jobs in a group having a job size that is less than a job size threshold. By excluding jobs that have a job size that is greater than the job size threshold, statistical outliers may be excluded from consideration. In an alternate embodiment, all jobs in a group may be used to obtain 325 the function. The function may be obtained 325 using robust linear regression procedures as taught in Modern Applied Statistics with S-Plus, 3rd Edition by W. N. Venables and B. D. Ripley, pp 167-170. Briefly, robust estimation is a theory of statistical estimation that rejects the influence of extreme data points that may represent outliers or "contaminated" data.

In an embodiment, a report of an expected device capacity for the document processing device may be stored 330. The report may include information pertaining to the actual print speed and capacity of the document printing device based on at least the function and the job size threshold. For example, the report may state that for all jobs having a job size that is less than the job size threshold, the job speed may be determined based on the linear function and the job size for the job. Similarly, the report may state that the percentage of the maximum job speed may be utilized as an effective job speed for all jobs having a job size that is greater than the job size threshold. In an embodiment, the stored report may be displayed to a user.

In an embodiment, one or more simulations may be performed using the functions aid the job size threshold as determined above to determine a device capacity function for document processing device deployed or deployable in a document processing environment. In an embodiment, a device capacity function based on job size may be determined for each document processing device in a document processing environment. A job size distribution for the document processing environment may then be used to identify whether one or more improvements can be made to a process flow in the document processing environment based on the device capacity functions for the document processing devices. Applying the job size distribution for the document processing environment may enable a user to identify whether jobs can be allocated more efficiently among document processing devices in a document processing environment, whether document processing devices should be added to or removed from a document processing environment, whether document processing devices within a document processing environment should be altered, and/or the like.

For example, if the document processing environment is dominated by smaller jobs, the application of the job size distribution to the device capacity function may identify a need for additional document processing devices of that type, in contrast, if the document processing environment is dominated by larger jobs, the application of the job size distribution to the device capacity function may identify that document processing devices may be removed from the document processing environment based on the results of the simulation.

In an alternate embodiment in which a new document processing environment is being constructed, a job size distribution may be applied to identity document processing devices that would be useful for the anticipated distribution. Additional and/or alternate determinations may be made as a result of applying a job size distribution to the device capacity functions for document processing devices in a document processing environment.

Figure 4:
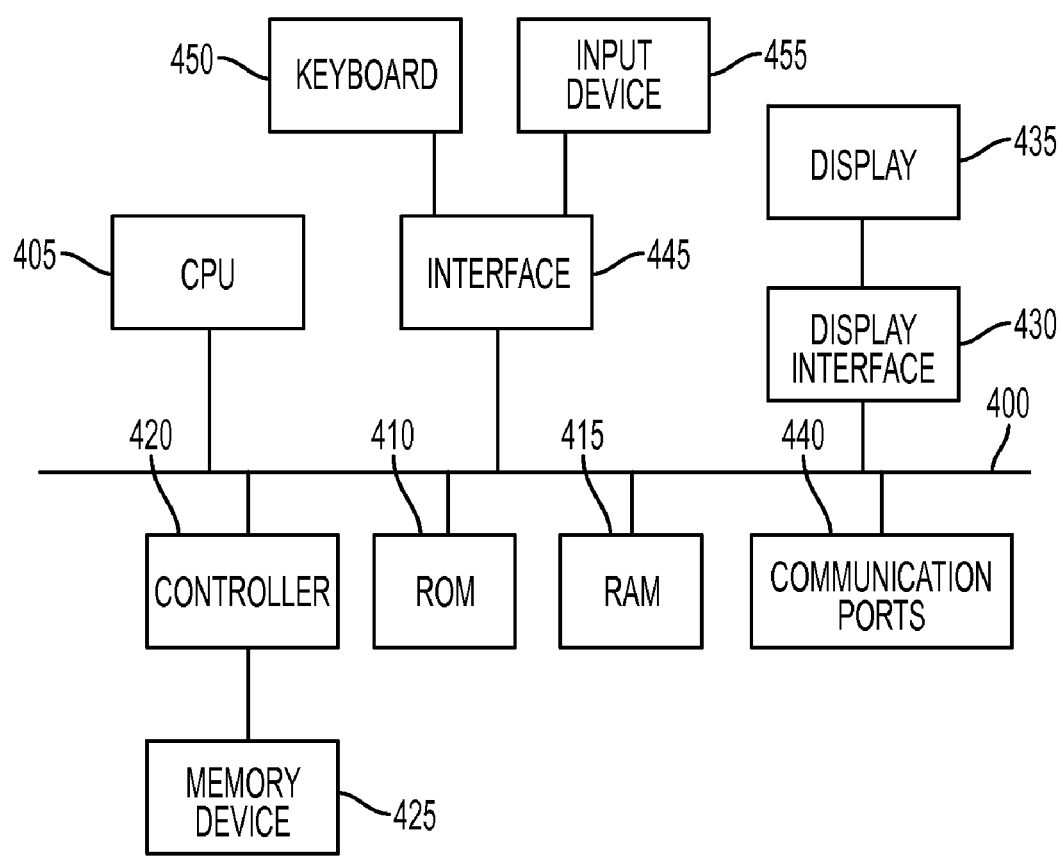
FIG. 4 depicts a block diagram of exemplary internal hardware that may be used to contain or implement program instructions according to an embodiment.

FIG. 4 depicts a block diagram of exemplary internal hardware that may be used to contain or implement program instructions according to an embodiment. A bus 400 serves as the main information highway interconnecting the other illustrated components of the hardware. CPU 405 is the central processing unit (i.e., the processor) of the system, performing calculations and logic operations required to execute a program. Read only memory (ROM) 410 and random access memory (RAM) 415 constitute exemplary memory devices (i.e., storage media).

A controller 420 interfaces with one or more optional memory devices 425 to the system bus 400. These memory devices 425 may include, for example, an external or internal DVD drive, a CD ROM drive, a hard drive, flash memory, a USB drive or the like. As indicated previously, these various drives and controllers are optional devices.

Program instructions may be stored in the ROM 410 and/or the RAM 415. Optionally, program instructions may be stored on a tangible storage medium such as a compact disk, a digital disk, flash memory, a memory card, a USB drive, an optical disc storage medium, such as Blu-ray™ disc, and/or other recording medium.

An optional display interface 430 may permit information from the bus 400 to be displayed on the display 435 in audio, visual, graphic or alphanumeric format. Communication with external devices may occur using various communication ports 440. An exemplary communication port 440 may be attached to a communications network, such as the Internet or an intranet.

The hardware may also include an interface 445 which allows for receipt of data from input devices such as a keyboard 450 or other input device 455 such as a mouse, a joystick, a touch screen, a remote control, a pointing device, a video input device and/or an audio input device.

An embedded system, such as a sub-system within a xerographic apparatus, may optionally be used to perform one, some or all of the operations described herein. Likewise, a multiprocessor system may optionally be used to perform one, some or all of the operations described herein.

It will be appreciated that various of the above-disclosed and other features and functions, or alternatives thereof may be desirably combined into many other different systems or applications. It will also be appreciated that various presently unforeseen or unanticipated alternatives, modifications, variations or improvements therein may be subsequently made by those skilled in the art which are also intended to be encompassed by the disclosed embodiments.

What is claimed is:

1. A system for determining print capacity, the system comprising:
    a processor; and
    a storage medium in operable communication with the processor,
    wherein the storage medium comprises one or more programming instructions for:
        receiving a maximum job speed for a document processing device,
        receiving information pertaining to a plurality of jobs performed by the document processing device, wherein the information for each job comprises a job speed and a job size,
        identifying, via the processor, a set of first jobs and a set of second jobs from the plurality of jobs, wherein each first job has a job speed greater than a percentage of the maximum job speed, and wherein each second job has a job speed less than the percentage of the maximum job speed,
        determining, via the processor, a job size threshold based on the job sizes for the first jobs and the job sizes for the second jobs,
        in response to determining the job size threshold, obtaining, via the processor, a linear function based on one or more second jobs, wherein the linear function comprises a function of job speed based on job size;
        repeating the receiving a maximum job speed, receiving information, identifying, determining, and obtaining operations for one or more document processing devices in a document processing environment, determining, via the processor, a device capacity function for each document processing device based on the obtained linear function and the job size threshold for the document processing device, and identifying one or more modifications to the document processing environment based on the device capacity functions.

2. The system of claim 1 wherein the one or more programming instructions for receiving information comprise one or more programming instructions for:

retrieving information from a log file corresponding to the document processing device; and determining a job speed and a job size for each job based on the log file information.

3. The method of claim 1 wherein the one or more programming instructions for receiving information comprise one or more programming instructions for receiving information pertaining to a job speed and job size for each of the plurality of jobs from a user.

4. The method of claim 1 wherein the one or more programming instructions for determining a job size threshold comprise one or more programming instructions for determining a job size threshold at which substantially each job having a job size greater than the job size threshold has a job speed that is greater than the percentage of the maximum job speed and substantially each job having a job size less than the job size threshold has a job speed that is less than the percentage of the maximum job speed.

5. The method of claim 1 wherein the one or more programming instructions for determining a job size threshold comprise one or more programming instructions for determining a job size threshold such that the sum of the number of first jobs having a job size greater than the job size threshold and the number of second jobs having a job size less than the job size threshold is maximized.

6. The method of claim 1 wherein the one or more programming instructions for determining a linear function comprise one or more programming instructions for determining a linear function based on one or more second jobs having a job size less than the job size threshold.

7. The method of claim 1 wherein the one or more programming instructions further comprise storing one or more recommendations to expand print capacity.

8. The method of claim 7, wherein the one or more programming instructions for storing one or more recommendations comprise one or more programming instructions for storing information pertaining to one or more document processing devices to be purchased.

9. The method of claim 1, wherein the one or more programming instructions further comprise storing a report of an expected device capacity for the document processing device based on at least the linear function and the job size threshold.

10. A computer-implemented method of determining print capacity, the method comprising:

receiving a maximum job speed for a document processing device;

receiving information pertaining to a plurality of jobs performed by the document processing device, wherein the information for each job comprises a job speed and a job size;

identifying, via a processor, a set of first jobs and a set of second jobs from the plurality of jobs, wherein each first job has a job speed greater than a percentage of the maximum job speed, and wherein each second job has a job speed less than the percentage of the maximum job speed;

determining, via the processor, a job size threshold based on the job sizes for the first jobs and the job sizes for the second jobs;

in response to determining the job size threshold, obtaining, via the processor, a linear function based on one or more second jobs, wherein the linear function comprises a function of job speed based on job size;

repeating the receiving a maximum job speed, receiving information, identifying, determining, and obtaining operations for one or more document processing devices in a document processing environment:

determining, via the processor, a device capacity function for each document processing device based on the obtained linear function and the job size threshold for the document processing device; and identifying one or more modifications to the document processing environment based on the device capacity functions.

11. The method of claim 10 wherein receiving information comprises:

retrieving information from a log file corresponding to the document processing device; and determining a job speed and a job size for each job based on the log file information.

12. The method of claim 10 wherein receiving information comprises receiving information pertaining to a job speed and job size for each of the plurality of jobs from a user.

13. The method of claim 10 wherein determining a job size threshold comprises determining a job size threshold at which substantially each job having a job size greater than the job size threshold has a job speed that is greater than the percentage of the maximum job speed and substantially each job having a job size less than the job size threshold has a job speed that is less than the percentage of the maximum job speed.

14. The method of claim 10 wherein determining a job size threshold comprises determining a job size threshold such that the sum of the number of first jobs having a job size greater than the job size threshold and the number of second jobs having a job size less than the job size threshold is maximized.

15. The method of claim 10 wherein determining a linear function comprises determining a linear function based on one or more second jobs having a job size less than the job size threshold.

16. The method of claim 10, further comprising:

storing one or more recommendations to expand print capacity.

17. The method of claim 16, wherein storing one or more recommendations comprises storing information pertaining to one or more document processing devices to be purchased.

18. The method of claim 10, further comprising:

storing a report of an expected device capacity for the document processing device based on at least the linear function and the job size threshold.

19. A computer-implemented method of determining print capacity, the method comprising:

receiving a maximum job speed for a document processing device;

receiving information pertaining to a plurality of jobs performed by the document processing device, wherein the information for each job comprises a job speed and a job size;

for each job, classifying, via a processor, the job into one of a plurality of groups based on the job speed for the job;

determining, via the processor, a job threshold size for a group based on at least the jobs classified within the group; and in response to determining the job size threshold, applying, via the processor, a regression model to the plurality of groups to determine a function for an expected device capacity based on job size.

20. The method of claim 19 wherein receiving information comprises:

retrieving information from a log file corresponding to the document processing device; and determining a job speed and a job size for each job based on the log file information.

21. The method of claim 19 wherein receiving information comprises receiving information pertaining to a job speed and job size for each of the plurality of jobs from a user.

22. The method of claim 19 wherein determining a job size threshold comprises determining a job size threshold at which substantially each job having a job size greater than the job size threshold has a job speed that is greater than the percentage of the maximum job speed and substantially each job having a job size less than the job size threshold has a job speed that is less than the percentage of the maximum job speed.

23. The method of claim 19, further comprising:

storing a report of an expected device capacity for the document processing device based on at least the linear function and the job size threshold.

* * * * *